United States Patent
Nikaido et al.

(10) Patent No.: US 10,533,781 B2
(45) Date of Patent: Jan. 14, 2020

(54) MACHINE QUANTITY CONTROLLING DEVICE, ENERGY SUPPLYING SYSTEM, MACHINE QUANTITY CONTROLLING METHOD, AND PROGRAM

(71) Applicant: MITSUBISHI HEAVY INDUSTRIES THERMAL SYSTEMS, LTD., Tokyo (JP)

(72) Inventors: Satoshi Nikaido, Tokyo (JP); Kenji Ueda, Tokyo (JP); Yoshie Togano, Tokyo (JP); Minoru Matsuo, Tokyo (JP); Koki Tateishi, Tokyo (JP)

(73) Assignee: MITSUBISHI HEAVY INDUSTRIES THERMAL SYSTEMS, LTD., Tokyo (JP)

(*) Notice: Subject to any disclaimer, the term of this patent is extended or adjusted under 35 U.S.C. 154(b) by 167 days.

(21) Appl. No.: 15/572,682

(22) PCT Filed: May 10, 2016

(86) PCT No.: PCT/JP2016/063854
§ 371 (c)(1),
(2) Date: Nov. 8, 2017

(87) PCT Pub. No.: WO2016/181961
PCT Pub. Date: Nov. 17, 2016

(65) Prior Publication Data
US 2018/0120000 A1 May 3, 2018

(30) Foreign Application Priority Data
May 13, 2015 (JP) .................... 2015-097881

(51) Int. Cl.
*F25B 27/02* (2006.01)
*F25B 49/04* (2006.01)
(Continued)

(52) U.S. Cl.
CPC .......... *F25B 27/02* (2013.01); *F24F 11/89* (2018.01); *F25B 27/00* (2013.01); *F25B 27/007* (2013.01); *F25B 49/043* (2013.01)

(58) Field of Classification Search
CPC ........ F25B 27/02; F25B 27/007; F25B 15/04; F25B 49/043; F24F 11/89; F24F 11/83;
(Continued)

(56) References Cited

U.S. PATENT DOCUMENTS

| | | | | |
|---|---|---|---|---|
| 4,630,670 A | * | 12/1986 | Wellman | F24F 3/0442 165/216 |
| 2008/0314564 A1 | * | 12/2008 | Nagaseki | G05D 23/19 165/104.31 |

(Continued)

FOREIGN PATENT DOCUMENTS

| | | | | |
|---|---|---|---|---|
| JP | 4535451 B2 | * | 9/2010 | |
| JP | 5244420 B2 | * | 7/2013 | .......... F04D 27/0261 |
| JP | 5558400 B2 | * | 7/2014 | .............. G06F 1/206 |

OTHER PUBLICATIONS

International Search Report and Written Opinion of the International Searching Authority (Forms PCT/ISA/210 and PCT/ISA/237) for International Application No. PCT/JP2016/063854, dated Aug. 2, 2016, with English translations.

*Primary Examiner* — Frantz F Jules
*Assistant Examiner* — Martha Tadesse
(74) *Attorney, Agent, or Firm* — Birch, Stewart, Kolasch & Birch, LLP

(57) ABSTRACT

A machine quantity controlling device which controls a quantity of a heat source device to operate in a heat source system including a first heat source device and a second heat source device, the first heat source device being a waste heat recovery type absorption chiller, the second heat source device other than a waste heat recovery type absorption
(Continued)

chiller, the machine quantity controlling device including an acquisition unit that obtains a waste heat utilization maximum load which is a maximum load when the first heat source device receives only supply of the waste heat; a determination unit that determines a predetermined load range from the waste heat utilization maximum load to be a first optimal load range as an optimal load range of the first heat source device; and a machine quantity control unit that controls a quantity of the second heat source device to operate so that the sum of a total of minimum values of the optimal load range of the first heat source device to operate and a total of minimum values of a second optimal load range of the second heat source device to operate is smaller than or equal to a load required for the heat source system, and the sum of a total of maximum values of a first optimal load range and a total of maximum values of the second optimal load range is equal to or greater than the load required for the heat source system, the second optimal load range being an optimal load range of the second heat source device to operate.

5 Claims, 9 Drawing Sheets

(51) Int. Cl.
*F24F 11/89* (2018.01)
*F25B 27/00* (2006.01)

(58) Field of Classification Search
CPC .. Y02A 30/274; Y02B 30/625; Y02B 30/745; F24D 2200/32
See application file for complete search history.

(56) References Cited

U.S. PATENT DOCUMENTS

| | | | |
|---|---|---|---|
| 2010/0170274 A1* | 7/2010 | Ueda | F04D 27/0261 62/238.6 |
| 2013/0274948 A1* | 10/2013 | Matsuo | G06F 1/206 700/300 |
| 2014/0358253 A1* | 12/2014 | Tateishi | F25B 1/053 700/19 |
| 2014/0374497 A1* | 12/2014 | Nikaido | F24F 11/89 236/1 C |
| 2015/0039134 A1* | 2/2015 | Nikaido | F25B 1/10 700/276 |
| 2015/0211753 A1* | 7/2015 | Ouchi | F24F 11/83 62/98 |
| 2015/0358695 A1* | 12/2015 | McGoogan | G01D 9/00 340/870.39 |
| 2016/0069220 A1* | 3/2016 | Wain | F02B 43/08 60/651 |
| 2016/0290674 A1* | 10/2016 | Tateishi | F24D 19/1006 |
| 2016/0341440 A1* | 11/2016 | Ouchi | F24F 11/83 |
| 2017/0307247 A1* | 10/2017 | Nikaido | F24F 11/65 |

\* cited by examiner

MACHINE QUANTITY CONTROLLING DEVICE, ENERGY SUPPLYING SYSTEM, MACHINE QUANTITY CONTROLLING METHOD, AND PROGRAM

TECHNICAL FIELD

The present invention relates to a machine quantity controlling device, an energy supplying system, a machine quantity controlling method, and a program.

Priority is claimed on Japanese Patent Application No. 2015-097881, filed May 13, 2015, the content of which is incorporated herein by reference.

BACKGROUND ART

One heat source system is a heat source system that includes a waste heat recovery type absorption chiller. The waste heat recovery type absorption chiller recovers waste heat from a gas engine or the like. Due to the waste heat recovery type absorption chiller recovering waste heat, an amount of fuel gas to be supplied can be reduced.

Patent Literature 1 discloses a technology relating to a heat source system that includes a waste heat recovery type absorption chiller. A gas absorption water chilling and warming device described in Patent Literature 1 corresponds to a waste heat recovery type absorption chiller, and a water chilling and warming system corresponds to the heat source system. This water chilling and warming system adjusts a quantity of gas absorption water chilling and warming devices to operate by comparing a cost of fuel gas and an operation cost of auxiliary machines. Specifically, the water chilling and warming system disclosed in Patent Literature 1 starts an operation of a second gas absorption water chilling and warming device at a load factor at which a cost of a fuel gas incurred when an operation of one gas absorption water chilling and warming device is performed using both of recovered waste heat and the fuel gas exceeds an operation cost of auxiliary machines when an operation of the second gas absorption water chilling and warming device is performed using recovered waste heat.

CITATION LIST

Patent Literature

[Patent Literature 1] Japanese Patent Publication No. 4535451

SUMMARY OF INVENTION

Technical Problem

Patent Literature 1 describes that the load factor brought about by the waste heat recovery is changed due to a load factor of an operation of a gas engine generator. However, Patent Literature 1 does not disclose how to deal with a factor other than the load factor brought about by the waste heat recovery. Even if a factor other than the load factor brought about by the waste heat recovery changes a capability of the waste heat recovery type absorption chiller, it is desirable to operate the heat source system with good efficiency.

The present invention aims to provide a machine quantity controlling device, an energy supplying system, a machine quantity controlling method, and a program which enable a heat source system to operate with good efficiency.

Solution to Problem

According to a first aspect of the present invention, a machine quantity controlling device includes an acquisition unit that obtains a waste heat utilization maximum load based on information indicating a relationship between a temperature of cooling water of the first heat source device and the waste heat utilization maximum load and a current temperature of the cooling water, the waste heat utilization maximum load being a maximum load when the first heat source device generates chilled heating medium by receiving only supply of the waste heat, the first heat source device in a heat source system including at least one first heat source device and a second heat source device, the first heat source device being a waste heat recovery type absorption chiller that generates chilled heating medium by receiving supply of at least one of waste heat and a fuel, the second heat source device being a heat source device other than a waste heat recovery type absorption chiller; a determination unit that determines a predetermined load range from the waste heat utilization maximum load to be a first optimal load range that is an optimal load range of the first heat source device; and a machine quantity control unit that causes at least one of the first heat source devices to operate and controls a quantity of second heat source devices to operate so that, when a load required for the heat source system is greater than a maximum value of the optimal load range of the first heat source device, the sum of a total of minimum values of the first optimal load range of the first heat source devices to operate and a total of minimum values of a second optimal load range of the second heat source device to operate is smaller than or equal to the load required for the heat source system and the sum of a total of maximum values of the first optimal load range and a total of maximum values of the second optimal load range is equal to or greater than the load required for the heat source system, the second optimal load range being set as an optimal load range in which the second heat source device to operate generates chilled heating medium.

The at least one first heat source device may be a plurality of first heat source devices, and the machine quantity control unit may maintain an operation of at least one of the plurality of first heat source devices and control a quantity of at least one of the first heat source devices other than the at least one first heat source device whose operation is maintained among the plurality of first heat source devices and the second heat source device to operate so that the sum of the total of the minimum values of the first optimal load range and the total of the minimum values of the second optimal load range is smaller than or equal to the load required for the heat source system and the sum of the total of the maximum values of the first optimal load range and the total of the maximum values of the second optimal load range is equal to or greater than the load required for the heat source system.

The acquisition unit may further obtain the waste heat utilization maximum load based on information indicating a relationship between an amount of waste heat to be supplied to the first heat source device and the waste heat utilization maximum load and a current amount of waste heat being supplied to the first heat source device.

According to a second aspect of the present invention, an energy supplying system includes the above-described machine quantity controlling device and the heat source system.

According to a third aspect of the present invention, a machine quantity controlling method is a machine quantity controlling method for a machine quantity controlling device which controls a quantity of first heat source devices and second heat source devices to operate in a heat source system including at least one first heat source device and a second heat source device, the first heat source device being a waste heat recovery type absorption chiller that generates chilled heating medium by receiving supply of at least one of waste heat and a fuel, the second heat source device being a heat source device other than a waste heat recovery type absorption chiller, the machine quantity controlling method including obtaining a waste heat utilization maximum load based on information indicating a relationship between a temperature of cooling water of the first heat source device and the waste heat utilization maximum load and a current temperature of the cooling water, the waste heat utilization maximum load being a maximum load when the first heat source device generates chilled heating medium by receiving only supply of the waste heat; determining a predetermined load range from the waste heat utilization maximum load to be a first optimal load range that is an optimal load range of the first heat source device; and causing at least one of the first heat source devices to operate and controlling a quantity of second heat source devices to operate so that, when a load required for the heat source system is greater than a maximum value of the optimal load range of the first heat source device, the sum of a total of minimum values of the first optimal load range of the first heat source devices to operate and a total of minimum values of a second optimal load range of the second heat source device to operate is smaller than or equal to the load required for the heat source system and the sum of a total of maximum values of the first optimal load range and a total of maximum values of the second optimal load range is equal to or greater than the load required for the heat source system, the second optimal load range being set as an optimal load range in which the second heat source device to be operated generates chilled heating medium.

According to a fourth aspect of the present invention, a program is a program causing a computer which controls a heat source system that includes at least one first heat source device and a second heat source device, the first heat source device being a waste heat recovery type absorption chiller that generates chilled heating medium by receiving supply of at least one of waste heat and a fuel, the second heat source device being s a heat source device other than a waste heat recovery type absorption chiller, to perform obtaining a waste heat utilization maximum load based on information indicating a relationship between a temperature of cooling water of the first heat source device and the waste heat utilization maximum load and a current temperature of the cooling water, the waste heat utilization maximum load being a maximum load when the first heat source device generates chilled heating medium by receiving only supply of the waste heat; determining a predetermined load range from the waste heat utilization maximum load to be a first optimal load range as an optimal load range of the first heat source device; and causing at least one of the first heat source devices to operate and controlling a quantity of second heat source devices to operate so that, when a load required for the heat source system is greater than a maximum value of the optimal load range of the first heat source device, the sum of a total of minimum values of the first optimal load range of the first heat source devices to operate and a total of minimum values of a second optimal load range of the second heat source device to operate is smaller than or equal to the load required for the heat source system and the sum of a total of maximum values of the first optimal load range and a total of maximum values of the second optimal load range is equal to or greater than the load required for the heat source system, the second optimal load range being set as an optimal load range in which the second heat source device to operate generates chilled heating medium.

Effect of the Invention

The above-described machine quantity controlling device, energy supplying system, machine quantity controlling method, and program can cause a heat source system to operate with good efficiency.

EMBODIMENTS FOR CARRYING OUT THE INVENTION

An embodiment of the present invention will be described below, but the embodiment to be described below does not limit the invention relating to the claims. In addition, all combinations of characteristics described in the embodiment are not essential to the solution to problems of the invention.

Figure 1:
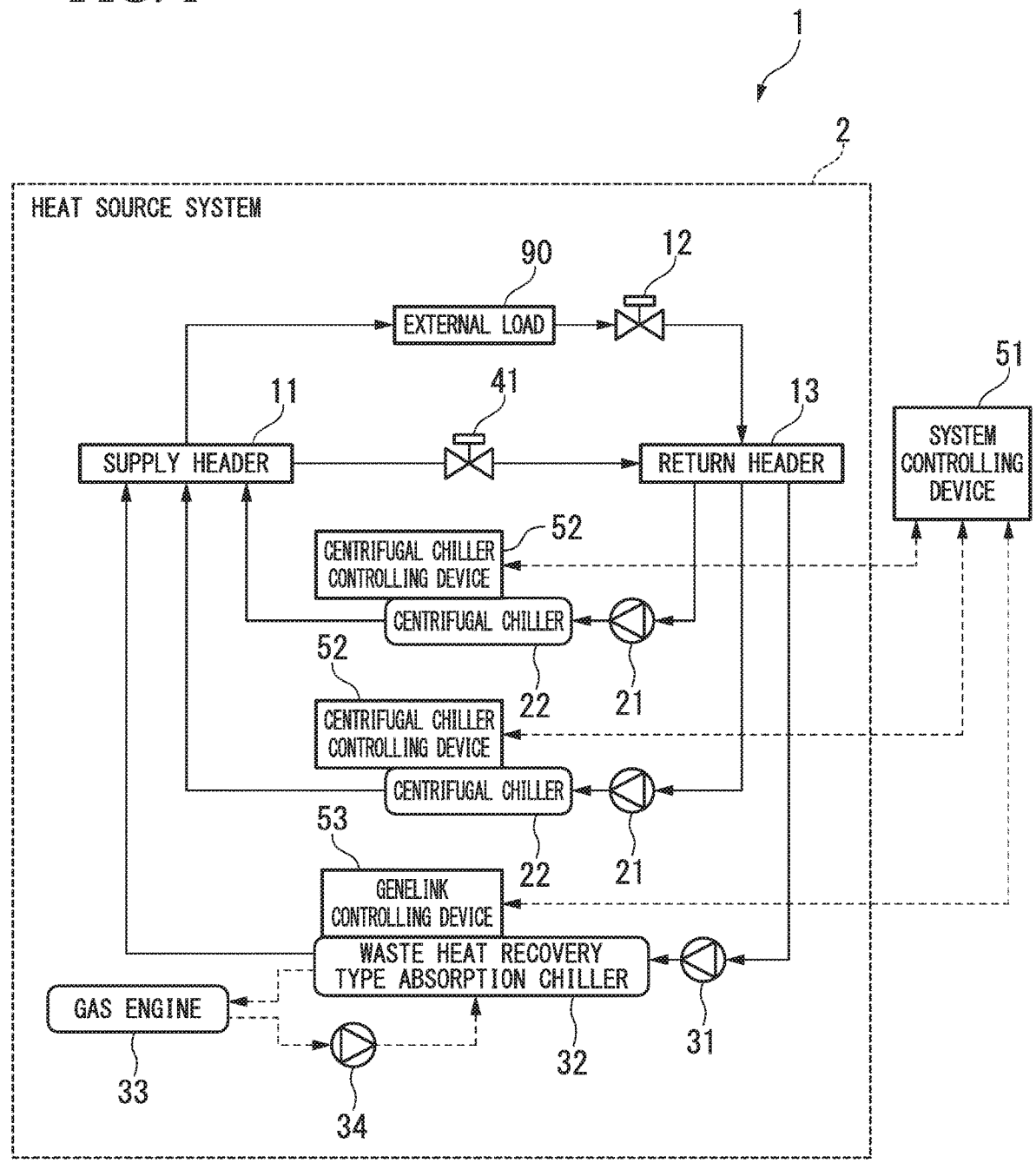
FIG. 1 is a schematic configuration diagram illustrating a device configuration of a heat source system according to an embodiment of the present invention.

FIG. 1 is a schematic configuration diagram illustrating a device configuration of a heat source system according to the embodiment of the present invention.

An energy supplying system 1 includes a heat source system 2 and a system controlling device 51 as illustrated in FIG. 1. The heat source system 2 includes a supply header 11, a medium flow rate control valve 12, a return header 13, centrifugal chiller-side pumps 21, centrifugal chillers 22, a genelink-side pump 31, a waste heat recovery type absorption chiller 32, a gas engine 33, a gas engine-side pump 34, a bypass valve 41, centrifugal chiller controlling devices 52, and a genelink controlling device 53. In the present embodiment, the heat source system 2 includes two centrifugal chiller-side pumps 21, two centrifugal chillers 22, one genelink-side pump 31, one waste heat recovery type absorption chiller 32, two centrifugal chiller controlling devices 52, and one genelink controlling device 53. The waste heat recovery type absorption chiller is also called a genelink.

The heat source system 2 is connected to an external load 90 through piping. Specifically, a route from the supply header 11 to the return header 13 via the external load 90 and the medium flow rate control valve 12 is configured with piping. In addition, a route of each of the two centrifugal chillers 22 from the return header 13 to the supply header 11 via the centrifugal chiller-side pump 21 and the centrifugal chiller 22 is configured with piping. Furthermore, a route from the return header 13 to the supply header 11 via the genelink-side pump 31 and the waste heat recovery type absorption chiller 32 is configured with piping.

Due to the above-described piping, the route of each of the centrifugal chillers 22 starting from the centrifugal chiller 22 and returning to the centrifugal chiller 22 via the supply header 11, the external load 90, the medium flow rate control valve 12, the return header 13, and the centrifugal chiller-side pump 21 is configured. In addition, the route starting from the waste heat recovery type absorption chiller 32 and returning to the waste heat recovery type absorption chiller 32 via the supply header 11, the external load 90, the medium flow rate control valve 12, the return header 13, and the genelink-side pump 31 is configured.

The heat source system 2 supplies chilled heating medium to the external load 90. The external load 90 may be a target to which chilled heating medium is supplied, and any of various loads is possible. For example, the external load 90 may be an air-conditioning facility installed in a building or equipment to be cooled installed in a factory.

Each of the centrifugal chillers 22 and the waste heat recovery type absorption chiller 32 corresponds to an example of a heat source device which generates chilled heating medium to be supplied to the external load 90. In particular, the waste heat recovery type absorption chiller 32 corresponds to an example of a first heat source device, and the centrifugal chillers 22 correspond to an example of second heat source devices. Each of the centrifugal chillers 22 and the waste heat recovery type absorption chiller 32 cools a heat transfer medium, for example, water. All of the centrifugal chillers 22 and the waste heat recovery type absorption chiller 32 are connected to the external load 90 in parallel through piping.

The number of waste heat recovery type absorption chillers 32 of the heat source system 2 may be one or more, and the number of heat source devices other than the waste heat recovery type absorption chiller of the heat source system 2 may be one or more.

Figure 2:
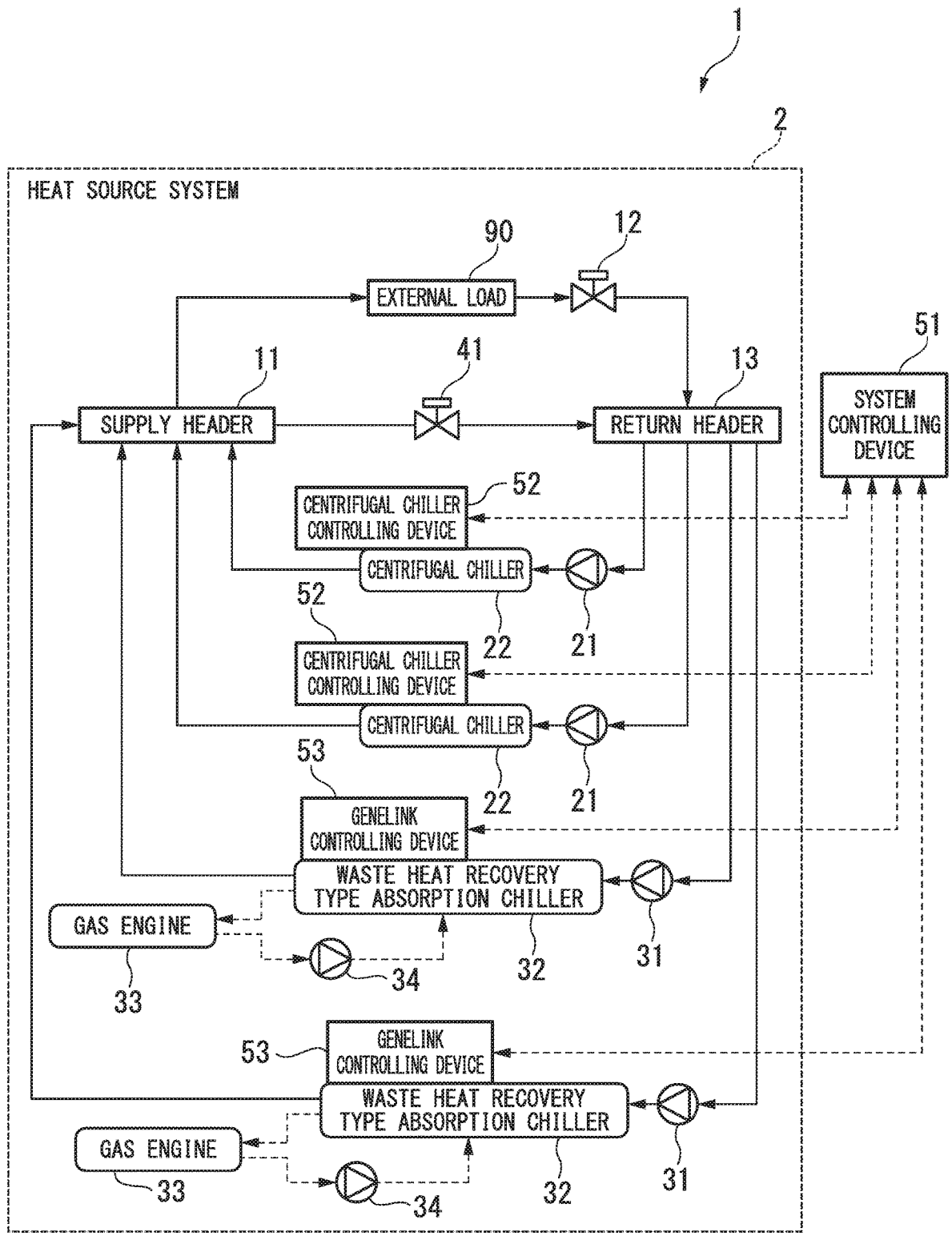
FIG. 2 is a schematic configuration diagram illustrating an example of a device configuration of the heat source system in which two waste heat recovery type absorption chillers are provided.

FIG. 2 is a schematic configuration diagram illustrating an example of a device configuration of the heat source system 2 in which two waste heat recovery type absorption chillers are provided. The configuration illustrated in FIG. 2 is similar to that illustrated in FIG. 1 except that the heat source system 2 includes the two waste heat recovery type absorption chillers 32. As described above, the heat source system 2 may include a plurality of waste heat recovery type absorption chillers 32.

In addition, heat source devices other than the waste heat recovery type absorption chillers included in the heat source system 2 are not limited to the centrifugal chillers 22. A heat source device other than a waste heat recovery type absorption chiller may be a water chilling and warming device other than a waste heat recovery type absorption chiller, or a heat source device other than a water chilling and warming device.

The heat source system 2 includes, for example, one or more waste heat recovery type absorption chillers 32 and one or more centrifugal chillers 22.

Alternatively, the heat source system 2 may include one or more absorption water chilling and warming devices of a type in which waste heat is not recovered, in addition to the one or more waste heat recovery type absorption chillers 32 and one or more centrifugal chillers 22. Alternatively, the heat source system 2 may not include the centrifugal chillers 22, but may include one or more absorption water chilling and warming devices of a type in which waste heat is not recovered, in addition to the one or more waste heat recovery type absorption chillers 32.

Furthermore, one gas engine 33 may be connected to a plurality of waste heat recovery type absorption chillers 32. In addition, a plurality of gas engines 33 may be connected to one waste heat recovery type absorption chiller 32.

The centrifugal chiller-side pumps 21 that send out a heat transfer medium using pressure are provided on an upstream side of each of the centrifugal chillers 22 in view of a flow of the heat transfer medium. The centrifugal chiller-side pumps 21 discharge a heat transfer medium from the return header 13 toward the centrifugal chillers 22. In addition, the genelink-side pumps 31 that send out a heat transfer medium using pressure are provided on an upstream side of the waste heat recovery type absorption chillers 32 in view of a flow of the heat transfer medium. The genelink-side pumps 31 discharge the heat transfer medium from the return header 13 toward the waste heat recovery type absorption chillers 32.

Each of the centrifugal chiller-side pumps 21 and the genelink-side pumps 31 may be a pump for a constant flow rate, or a pump for a variable flow rate. For example, each of the centrifugal chiller-side pumps 21 and the genelink-side pumps 31 may have a variable flow rate due to being driven by an inverter motor such that have a variable rotational speed. In a case in which flow rates of the centrifugal chiller-side pumps 21 and the genelink-side pumps 31 are variable, the heat source system 2 may have a configuration without the medium flow rate control valve 12.

The supply header 11 contains a heat transfer medium cooled by the centrifugal chillers 22 and the waste heat recovery type absorption chillers 32. The heat transfer medium contained in the supply header 11 is discharged to the external load 90.

The heat transfer medium that has passed through the external load 90 is discharged to the return header 13. The medium flow rate control valve 12 is provided between the external load 90 and the return header 13, and the medium flow rate control valve 12 adjusts a flow rate of the heat transfer medium to be supplied to the external load 90.

A bypass route is provided between the supply header 11 and the return header 13, and the bypass valve 41 is provided on the bypass route. The bypass valve 41 adjusts a flow rate of the heat transfer medium flowing in the bypass route.

The system controlling device 51 corresponds to an example of a machine quantity controlling device, which determines a quantity of centrifugal chillers 22 and waste heat recovery type absorption chillers 32 to operate. In addition, the system controlling device 51 determines devices to be operated or be stopped among the centrifugal chillers 22 and the waste heat recovery type absorption chillers 32 in accordance with the determined quantity of devices to operate. Furthermore, the system controlling device 51 allocates an amount of required chilled heating medium with respect to the heat source system 2 when the centrifugal chiller-side pumps 21 and the genelink-side pumps 31 change a flow rate or the centrifugal chiller controlling devices 52 and the genelink controlling devices 53 change a setting of a water delivery temperature. The system controlling device 51 gives various instructions such as an instruction to activate or stop a device or an instruction on an amount of required chilled heating medium to the centrifugal chiller controlling devices 52 and the genelink controlling devices 53 based on a result of the determination of devices to be operated or stopped and a result of the allocation of the amount of required chilled heating medium to the devices.

The centrifugal chiller controlling devices 52 control the centrifugal chillers 22 complying with an instruction from the system controlling device 51. The genelink controlling devices 53 control the waste heat recovery type absorption chillers 32 complying with an instruction from the system controlling device 51.

Figure 3:
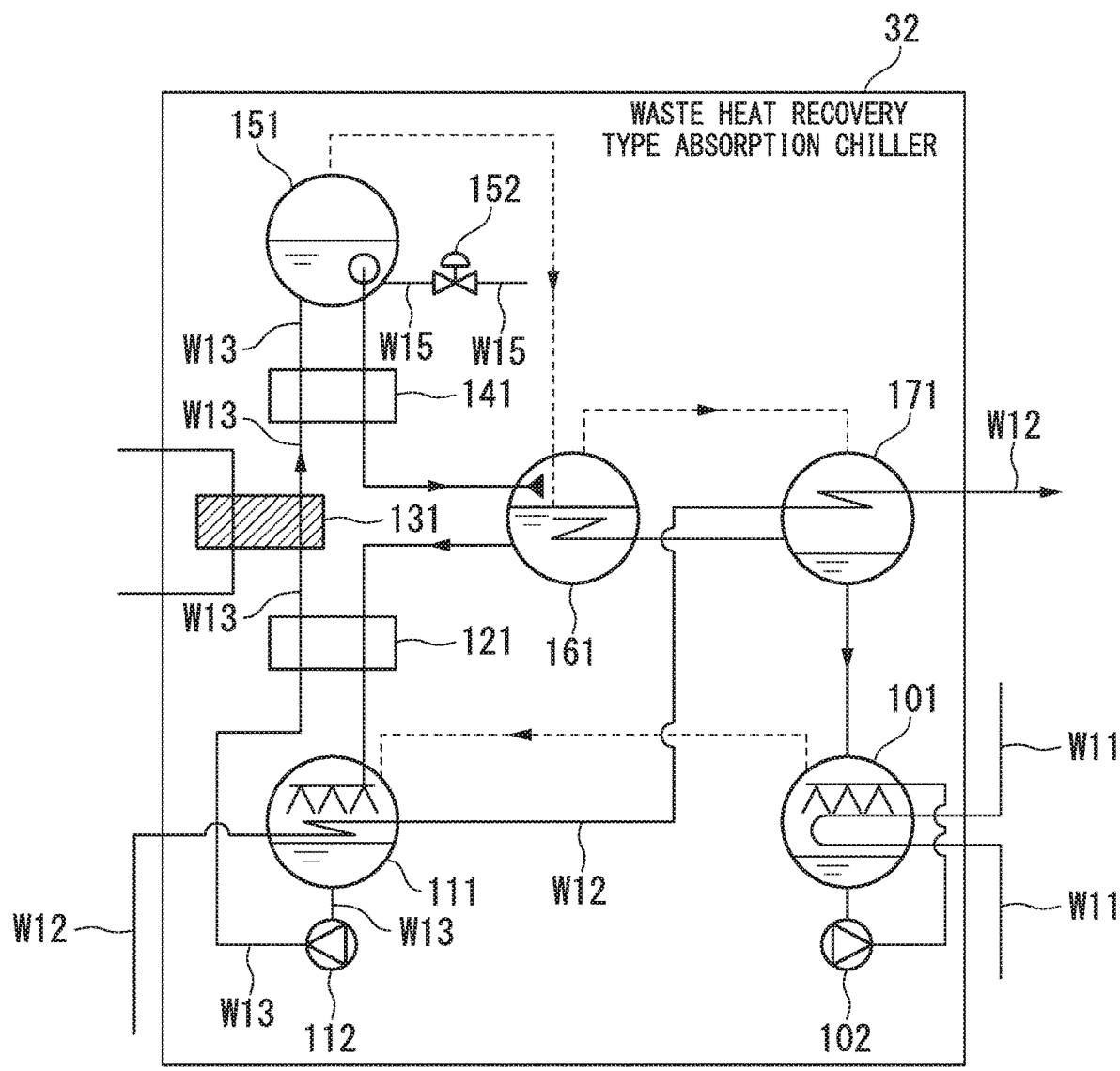
FIG. 3 is a schematic block diagram illustrating a functional configuration of the waste heat recovery type absorption chiller according to the embodiment of the present invention.

FIG. 3 is a schematic block diagram illustrating a functional configuration of the waste heat recovery type absorption chiller 32. As illustrated in FIG. 3, the waste heat recovery type absorption chiller 32 includes an evaporator 101, a refrigerant pump 102, an absorber 111, a solution pump 112, a low-temperature heat exchanger 121, a waste heat recovery heat exchanger 131, a high-temperature heat exchanger 141, a high-temperature regenerator 151, a gas flow control valve 152, a low-temperature regenerator 161, and a condenser 171.

A liquid refrigerant in the evaporator 101 takes heat from a heat transfer medium flowing in a route W11 and evaporates. Water, for example, may be used as a refrigerant. Alternatively, ammonia may be used as a refrigerant. The refrigerant pump 102 is connected to a pipe coming out from the bottom of the evaporator 101. The pipe coming out from the refrigerant pump 102 enters the evaporator 101 at an upper part of the evaporator 101, and spraying ports of the refrigerant are provided on the pipe in the evaporator 101. The refrigerant pump 102 prompts evaporation of the refrigerant by spraying the liquid refrigerant that has been accumulated in the bottom of the evaporator 101 from the spraying ports inside the evaporator 101.

The evaporated refrigerant will be referred to as refrigerant vapor hereinbelow. The evaporator 101 and the absorber 111 are connected through piping, and the refrigerant vapor is discharged from the evaporator 101 to the absorber 111.

In the absorber 111, the refrigerant flowing thereinto from the evaporator 101 as refrigerant vapor is absorbed into a solution. In a case in which the refrigerant is water, for example, an aqueous lithium bromide solution may be used as a solution. In a case in which the refrigerant is ammonia, water may be used as a solution. The solution that has absorbed the refrigerant in the absorber 111 will be referred to as a dilute solution below.

A route W12 is formed with piping starting from an outside of the waste heat recovery type absorption chiller 32, passing through the absorber 111 and the condenser 171 inside the waste heat recovery type absorption chiller 32, and reaching an outside of the waste heat recovery type absorption chiller 32, and heat generated in the course of the absorption that occurs in the absorber 111 is removed by cooling water passing through the route W12.

A path W13 (a dilute solution line) is formed with piping starting from the absorber 111, passing through the solution pump 112, the low-temperature heat exchanger 121, the waste heat recovery heat exchanger 131, and the high-temperature heat exchanger 141, and reaching the high-temperature regenerator 151. The solution pump 112 discharges the dilute solution from the absorber 111 to the high-temperature regenerator 151 on the route W13.

The dilute solution undergoes heat exchange with a solution flowing from the low-temperature regenerator 161 to the absorber 111 in the low-temperature heat exchanger 121. The dilute solution is heated through this heat exchange.

The dilute solution is heated by waste heat from the gas engine 33 in the waste heat recovery heat exchanger 131.

The dilute solution undergoes heat exchange with a solution flowing from the high-temperature regenerator 151 to the low-temperature regenerator 161 in the high-temperature heat exchanger 141. The dilute solution is heated through this heat exchange.

The waste heat recovery type absorption chiller 32 generates chilled heating medium by receiving supply of at least one of waste heat from the gas engine 33 and city gas, which is a fuel. In a case in which waste heat is supplied, the waste heat recovery type absorption chiller 32 generates chilled heating medium by heating the dilute solution in the waste heat recovery heat exchanger 131. In addition, in a case in which the fuel is supplied, the waste heat recovery type absorption chiller 32 generates chilled heating medium by heating the dilute solution in the high-temperature regenerator 151.

The high-temperature regenerator 151 heats the dilute solution by combusting city gas supplied from the route W15 constituted by gas pipes using it as fuel gas, and thus the dilute solution is evaporated and becomes refrigerant vapor. The gas flow control valve 152 provided on the route W15 adjusts a flow rate of the city gas to be supplied to the high-temperature regenerator 151. The city gas corresponds to an example of a fuel supplied to the waste heat recovery type absorption chiller 32. However, a fuel to be supplied to the waste heat recovery type absorption chiller 32 is not limited to city gas, and any of various kinds of fuels can be used. For example, the high-temperature regenerator 151 may receive supply of kerosene as a fuel, or supply of a gas other than city gas, such as propane gas.

The dilute solution is concentrated through the evaporation of the refrigerant vapor. A solution concentrated in the high-temperature regenerator 151 will be referred to as an intermediate concentration solution below. Piping starting from the high-temperature regenerator 151, passing through the high-temperature heat exchanger 141, and reaching the low-temperature regenerator 161 is provided. The intermediate concentration solution coming from the high-temperature regenerator 151 undergoes heat exchange with the dilute solution in the high-temperature heat exchanger 141, and then flows into the low-temperature regenerator 161.

Piping starting from the high-temperature regenerator 151, passing through the low-temperature regenerator 161, and reaching the condenser 171 is provided, and the refrigerant vapor obtained through the evaporation of the dilute solution in the high-temperature regenerator 151 passes through the low-temperature regenerator 161 and then flows into the condenser 171.

The refrigerant vapor from the high-temperature regenerator 151 becomes a heating medium and heats the intermediate concentration solution in the low-temperature regenerator 161. With this heating, the refrigerant vapor evaporates from the intermediate concentration solution. Due to the evaporation of the refrigerant vapor, the intermediate concentration solution becomes more concentrated. The solution concentrated in the low-temperature regenerator 161 will be referred to as a high concentration solution below. Piping starting from the low-temperature regenerator 161, passing through the low-temperature heat exchanger 121, and reaching the absorber 111 is provided, and the high concentration solution coming from the low-temperature regenerator 161 undergoes heat exchange with the dilute solution in the low-temperature heat exchanger 121, then flows into the absorber 111, absorbs the refrigerant, and thereby becomes a dilute solution.

Piping connecting the low-temperature regenerator and the condenser 171 is provided. The refrigerant vapor that has evaporated from the intermediate concentration solution in the low-temperature regenerator 161 flows into the condenser 171.

The refrigerant vapor is cooled by cooling water, thus is condensed, and then becomes a liquid refrigerant in the condenser 171. Piping connecting the condenser 171 and the evaporator 101 is provided. This liquid refrigerant is discharged from the condenser 171 to the evaporator 101.

Figure 4:
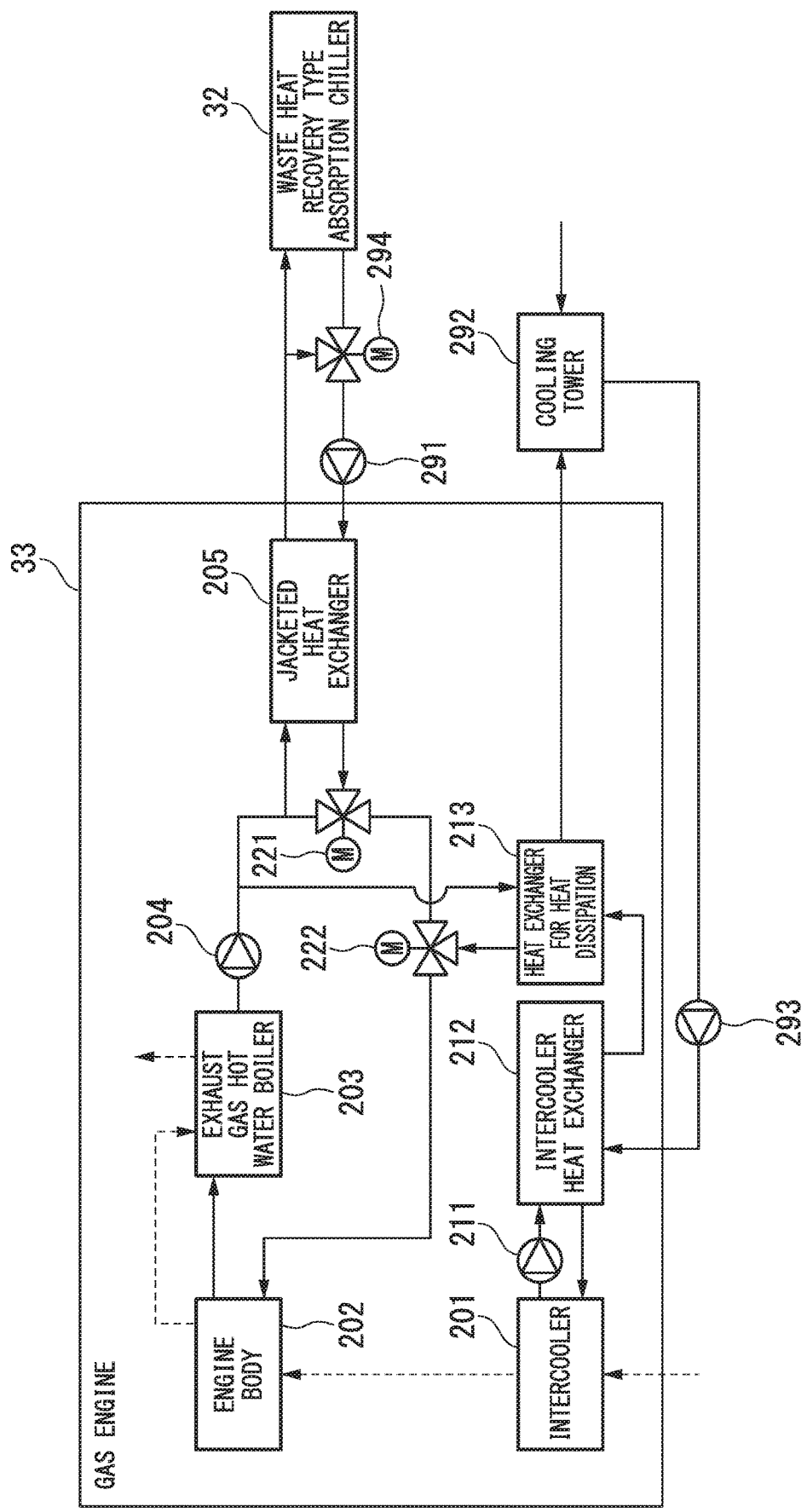
FIG. 4 is a schematic block diagram illustrating a functional configuration of a gas engine according to the embodiment of the present invention.

FIG. 4 is a schematic block diagram illustrating a functional configuration of the gas engine 33. As illustrated in FIG. 4, the gas engine 33 includes an intercooler 201, an engine body 202, an exhaust gas hot water boiler 203, an engine cooling water pump 204, a jacketed heat exchanger 205, an intercooler pump 211, an intercooler heat exchanger 212, a heat exchanger for heat dissipation 213, a first three-way valve 221, and a second three-way valve 222.

The intercooler 201 cools air taken in from outside the gas engine 33 and supplies the cooled air to the engine body 202.

The engine body 202 mixes fuel gas supplied from outside the gas engine 33 with the air from the intercooler 201 and combusts the air mixture.

The exhaust gas hot water boiler 203 heats engine cooling water with exhaust gas from the engine body 202. The engine cooling water is used to cool the engine body 202 and also used as a heat medium that transmits waste heat from the engine body to the jacketed heat exchanger 205. In a case of a specification of a gas engine in which exhaust gas is used as a heat source for other purposes such as generation of vapor, the exhaust gas hot water boiler 203 may not be installed.

A circulation route of the engine cooling water is formed by providing piping starting from the engine body 202, passing through the exhaust gas hot water boiler 203, the engine cooling water pump 204, the jacketed heat exchanger 205, the first three-way valve 221, and the second three-way valve 222, and returning to the engine body 202. Due to the engine cooling water pump 204, the engine cooling water circulates through the circulation route in the order of the engine body 202, the exhaust gas hot water boiler 203, the engine cooling water pump 204, the jacketed heat exchanger 205, the first three-way valve 221, the second three-way valve 222, and the engine body 202.

Piping connecting the engine cooling water pump 204 and the jacketed heat exchanger 205 bifurcates at the first three-way valve 221. Due to this bifurcating piping, some of the engine cooling water coming from the engine cooling water pump 204 bypasses the jacketed heat exchanger 205 and is conveyed to the first three-way valve 221.

The first three-way valve 221 is a motor-operated valve which adjusts a flow rate of the engine cooling water coming from the engine cooling water pump 204, bypassing the jacketed heat exchanger 205, and being conveyed to the first three-way valve 221.

Piping, which bifurcates from the piping starting from the engine cooling water pump 204, passing through the jacketed heat exchanger 205, and reaching the second three-way valve 222, starting from the engine cooling water pump 204, passing through the heat exchanger for heat dissipation 213, and reaching the second three-way valve 222 is provided. Some of the engine cooling water is discharged from the exhaust gas hot water boiler 203 to the heat exchanger for heat dissipation 213 through this piping, then dissipate heat in the heat exchanger for heat dissipation 213, and then is discharged to the engine body 202. Due to heat dissipation of the heat exchanger for heat dissipation 213, a temperature of the engine cooling water to be supplied to the engine body 202 is adjusted.

The second three-way valve 222 is a motor-operated valve, which adjusts a flow rate of engine cooling water coming from the engine cooling water pump 204, passing through the heat exchanger for heat dissipation 213, and reaching the second three-way valve 222.

In the jacketed heat exchanger 205, the engine cooling water from the exhaust gas hot water boiler 203 and hot water from the waste heat recovery type absorption chiller 32 undergo heat exchange. The hot water from the waste heat recovery type absorption chiller 32 uses waste heat of the gas engine 33 as a heat medium to be transmitted to the waste heat recovery type absorption chiller 32. The hot water is caused to circulate between the jacketed heat exchanger 205 and the waste heat recovery type absorption chiller 32 by a waste heat transmission pump 291. Due to the heat exchange performed in the jacketed heat exchanger 205, the hot water from the waste heat recovery type absorption chiller 32 is heated and the engine cooling water is cooled.

Piping starting from the jacketed heat exchanger 205, passing through the waste heat recovery type absorption chiller 32, a third three-way valve 294, and the waste heat transmission pump 291, and returning to the jacketed heat exchanger 205 is provided. Due to this piping, a medium that transmits waste heat of the gas engine 33 to the waste heat recovery type absorption chiller 32 circulates between the jacketed heat exchanger 205 and the waste heat recovery type absorption chiller 32.

Piping connecting the jacketed heat exchanger 205 and the waste heat recovery type absorption chiller 32 bifurcates at the third three-way valve 294. Due to this bifurcating piping, some of a heat medium from the jacketed heat exchanger 205 bypasses the waste heat recovery type absorption chiller 32, being conveyed to the third three-way valve 294.

The third three-way valve 294 is a motor-operated valve which adjusts a flow rate of some of the heat medium from the jacketed heat exchanger 205 to cause some of the heat medium to bypass the waste heat recovery type absorption chiller 32 and to be conveyed to the third three-way valve 294.

The intercooler pump 211 is provided on piping starting from the intercooler 201, passing through the intercooler heat exchanger 212, and returning to the intercooler 201. The intercooler pump 211 discharges cooling water that has absorbed heat from air in the intercooler to the intercooler heat exchanger 212 to be cooled and then the cooling water returns to the intercooler 201.

The intercooler heat exchanger 212 causes the cooling water used in the intercooler 201 to undergo heat exchange with cooling water from a cooling tower. The cooling water used in the intercooler 201 is cooled due to this heat exchange as described above.

Piping starting from the heat exchanger for heat dissipation 213, passing through the cooling tower 292, a cooling tower pump 293, and the intercooler heat exchanger 212, and returning to the heat exchanger for heat dissipation 213 is provided. In the heat exchanger for heat dissipation 213, cooling water coming out from the cooling tower 292, passing through the intercooler heat exchanger 212, and then flowing into the heat exchanger for heat dissipation 213 further undergoes heat exchange with engine cooling water. The engine cooling water is cooled due to this heat exchange as described above.

In the cooling tower 292, the cooling water that has been heated in the intercooler heat exchanger 212 and the heat exchanger for heat dissipation 213 due to the heat exchange emits heat. The cooling tower pump 293 causes the cooling water that has emitted heat in the cooling tower to pass through the intercooler heat exchanger 212 and the heat exchanger for heat dissipation 213 and to return to the cooling tower 292.

Figure 5:
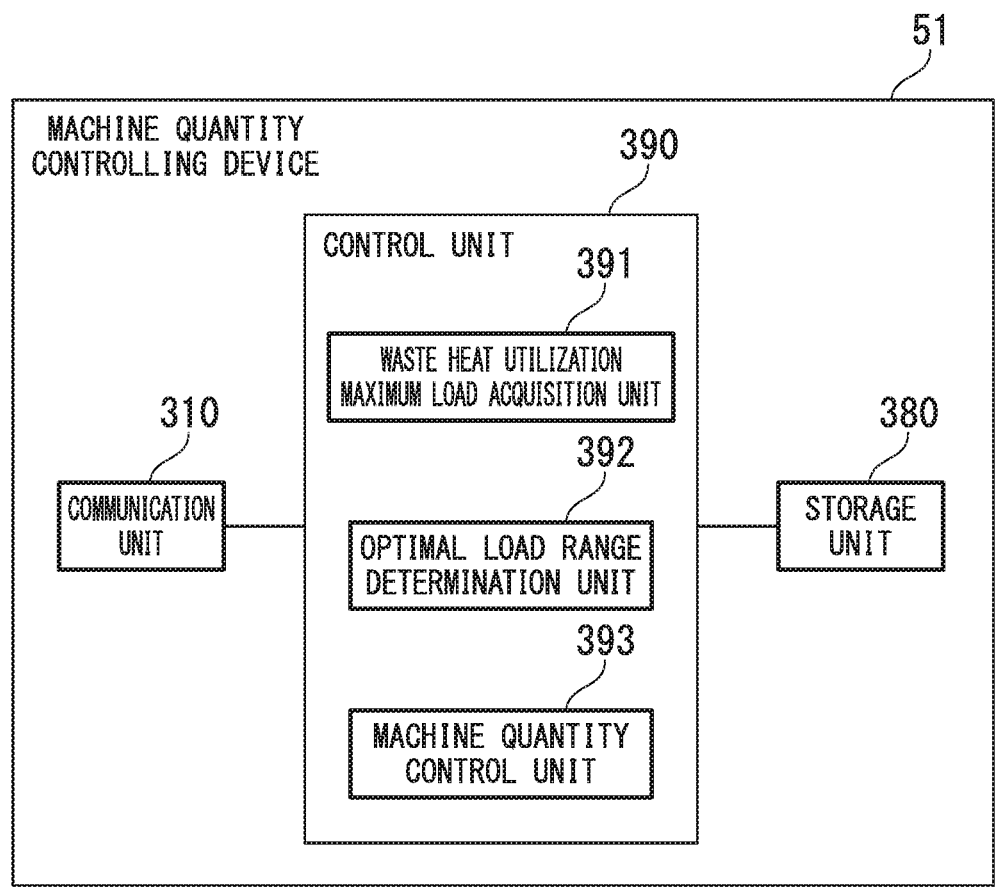
FIG. 5 is a schematic block diagram illustrating a functional configuration of a system controlling device according to the embodiment of the present invention.

FIG. 5 is a schematic block diagram illustrating a functional configuration of the system controlling device 51. As illustrated in FIG. 5, the system controlling device 51 includes a communication unit 310, a storage unit 380, and a control unit 390. The control unit 390 includes a waste heat utilization maximum load acquisition unit (an acquisition unit) 391, an optimal load range determination unit (a determination unit) 392, and a machine quantity control unit 393.

The system controlling device 51 can be realized by, for example, a computer.

The communication unit 310 communicates with the centrifugal chiller controlling devices 52. By communicating with the centrifugal chiller controlling devices 52, the system controlling device 51 acquires condition information of the centrifugal chillers 22, and instructs the centrifugal chiller controlling devices 52 to control the centrifugal chillers 22. In addition, the communication unit 310 communicates with the genelink controlling devices 53. By communicating with the genelink controlling devices 53, the system controlling device 51 acquires condition information of the waste heat recovery type absorption chillers 32, and instructs the genelink controlling devices 53 to control the waste heat recovery type absorption chillers 32. In a case in which the centrifugal chiller controlling devices 52 and the genelink controlling devices 53 do not have the communication function with respect to the system controlling device 51, condition information regarding refrigerators is acquired by installing sensors or using hardwiring.

The storage unit 380 is configured with a memory device included in the system controlling device 51 and stores various kinds of information.

The control unit 390 controls the constituent units of the system controlling device 51 to cause the units to perform various processes.

The waste heat utilization maximum load acquisition unit 391 obtains a waste heat utilization maximum load that is a maximum load (a maximum capability) when the waste heat recovery type absorption chiller 32 receives only supply of waste heat based on information indicating a relationship between a temperature of cooling water of the waste heat recovery type absorption chiller 32 and the waste heat utilization maximum load and a current temperature of the cooling water.

Here, the waste heat utilization maximum load acquired by the waste heat utilization maximum load acquisition unit 391 will be described with reference to FIGS. 6 and 7.

Figure 6:
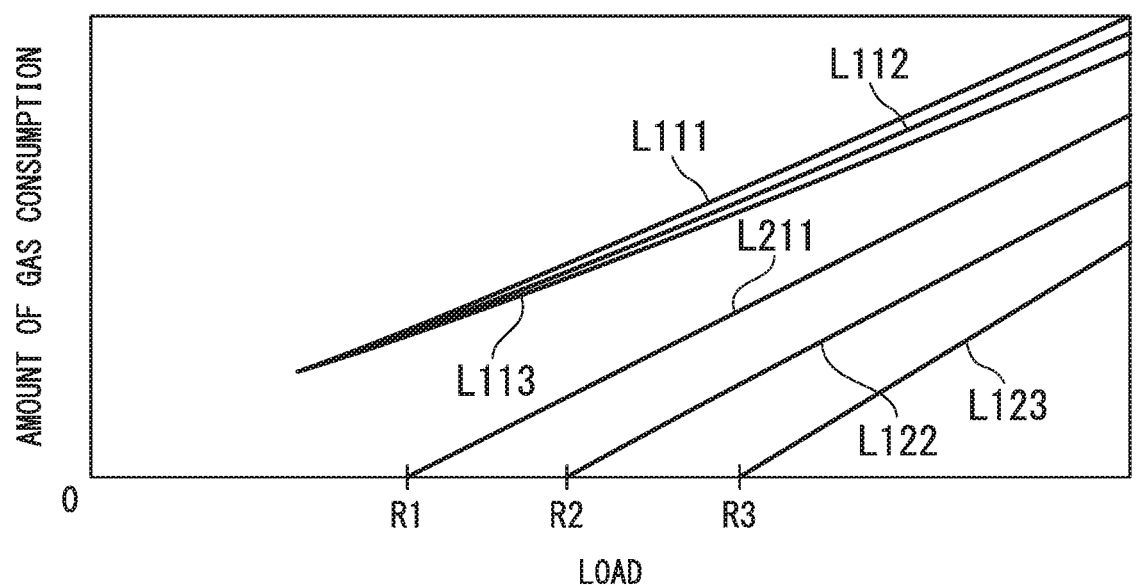
FIG. 6 is a graph showing a relationship between load and amount of gas consumption of the waste heat recovery type absorption chiller when the gas engine emits a sufficient amount of waste heat according to the embodiment of the present invention.

FIG. 6 is a graph showing a relationship between load and amount of gas consumption of the waste heat recovery type absorption chiller 32 when the gas engine 33 emits a sufficient amount of waste heat. The horizontal axis of FIG. 6 represents the load of the waste heat recovery type absorption chiller 32 and the vertical axis thereof represents the amount of gas consumption. The load referred to here is an amount of heat for chilled heating medium output by a heat source device.

All lines L111 to L113 indicate relationships between loads and amounts of gas consumption when there is no supply of waste heat from the gas engine 33. Each of the lines L111, L112, and L113 indicates a relationship between load and amount of gas consumption when a cooling water inlet temperature is T1° C., T2° C., or T3° C. The cooling water inlet temperature mentioned here is a temperature of cooling water at an inlet of the absorber 111. All the T1, T2, and T3 are constants and satisfy "T1>T2>T3."

All lines L121 to L123 indicate relationships between loads and amounts of gas consumption when there is supply of waste heat from the gas engine 33. Each of the lines L121, L122, and L123 indicates a relationship between load and amount of gas consumption when a cooling water inlet temperature is T1° C., T2° C., or T3° C.

As indicated by the lines L121 to L123, the amount of gas consumption can be zero (0) at a given load or smaller in a case in which the waste heat recovery type absorption chiller 32 receives supply of waste heat from the gas engine 33. For example, when the cooling water inlet temperature is T1° C., the amount of gas consumption is zero at load R1 or smaller. The relationship between the load and the amount of gas consumption when the cooling water inlet temperature is T1° C. is indicated by the line L121. R1 is a constant.

In addition, the amount of gas consumption is zero at a load R2 or smaller when the cooling water inlet temperature is T2° C. The relationship between the load and the amount of gas consumption when the cooling water inlet temperature is T2° C. is indicated by the line L122. R2 is a constant.

Furthermore, the amount of gas consumption is zero at a load R3 or smaller when the cooling water inlet temperature is T3° C. The relationship between the load and the amount of gas consumption when the cooling water inlet temperature is T3° C. is indicated by the line L123. R3 is a constant.

A maximum load in loads at which the amount of gas consumption of the waste heat recovery type absorption chiller 32 is zero will be referred to as a waste heat utilization maximum load below. The waste heat utilization maximum load when the cooling water inlet temperature is T1° C. is, for example, the load R1. The waste heat utilization maximum load when the cooling water inlet temperature is T2° C. is the load R2. The waste heat utilization maximum load when the cooling water inlet temperature is T3° C. is the load R3.

If the system controlling device 51 controls a quantity of centrifugal chillers 22 and waste heat recovery type absorption chillers 32 to operate and thus causes the waste heat recovery type absorption chillers 32 to operate at around the waste heat utilization maximum load, the amount of gas consumption of the waste heat recovery type absorption chillers 32 can be reduced. A coefficient of performance (COP) of the waste heat recovery type absorption chiller 32 is considered to have a maximum value at the waste heat utilization maximum load.

The relationship between a waste heat utilization maximum load $Q_{opt1}$ and a cooling water inlet temperature Ti as shown in FIG. 6 can be expressed as Formula (1) using a function f1 of the cooling water inlet temperature Ti.

[Math. 1]

$$Q_{opt1} = f_1(Ti) \qquad (1)$$

For example, the storage unit 380 may store the function $f_1$ in advance and the waste heat utilization maximum load acquisition unit 391 may read the function $f_1$ from the storage unit 380. Furthermore, the waste heat utilization maximum load acquisition unit 391 acquires a measured cooling water inlet temperature from the waste heat recovery type absorption chiller 32 via the communication unit 310. Then, the waste heat utilization maximum load acquisition unit 391 substitutes the measured cooling water inlet temperature into the function $f_1$ to calculate the waste heat utilization maximum load $Q_{opt1}$.

However, a form of information indicating a relationship between the cooling water inlet temperature and the waste heat utilization maximum load stored in the storage unit 380 is not limited to a function form. For example, the storage unit 380 may store the relationship between the cooling water inlet temperature and the waste heat utilization maximum load in a table form.

In addition, a cooling water temperature used by the waste heat utilization maximum load acquisition unit 391 to acquire the waste heat utilization maximum load is not limited to a cooling water inlet temperature. For example, the waste heat utilization maximum load acquisition unit 391 may use a temperature of the cooling water at an outlet of the absorber 111.

In a case in which the waste heat utilization maximum load $Q_{opt1}$ and the cooling water inlet temperature Ti have a substantially linear relationship, the relationship between the waste heat utilization maximum load $Q_{opt1}$ and the cooling water inlet temperature Ti can be set to an approximate straight line using a linear function of the cooling water inlet temperature Ti as the function $f_1$. In this case, the storage unit 380 may store the linear function as the function $f_1$, and thus a required storage capacity may be small.

In addition, the waste heat utilization maximum load acquisition unit 391 can calculate the waste heat utilization maximum load by performing a simple arithmetic process of substituting a value into the linear function, and thus a processing load of the waste heat utilization maximum load acquisition unit 391 can be reduced from that perspective.

As described above, FIG. 6 shows an example of the relationship between the load and the amount of gas consumption of the waste heat recovery type absorption chiller 32 when the gas engine 33 emits a sufficient amount of waste heat. On the contrary, a case in which the waste heat recovery type absorption chiller 32 has difficulty obtaining a sufficient amount of waste heat due to a balance between capabilities of the gas engine 33 and the waste heat recovery type absorption chiller 32 or a change in an output of the gas engine 33 may be conceived.

Thus, a relationship between an optimal load range of the waste heat recovery type absorption chiller 32 and an amount of recovered waste heat E from the gas engine 33 and the cooling water inlet temperature Ti will be described below.

Figure 7:
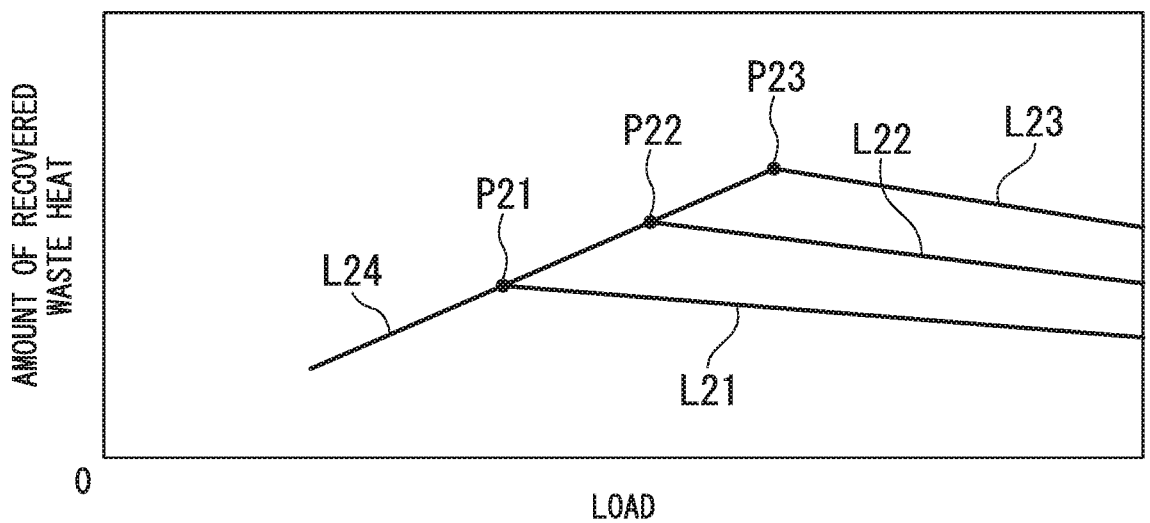
FIG. 7 is a graph showing an example of a relationship between loads of the waste heat recovery type absorption chiller according to the embodiment of the present invention and a recovery amount of waste heat from the gas engine.

FIG. 7 is a graph showing an example of a relationship between load of the waste heat recovery type absorption chiller 32 and amount of recovered waste heat from the gas engine 33. The horizontal axis of FIG. 7 represents the load of the waste heat recovery type absorption chiller 32 and the vertical axis thereof represents the amount of recovered waste heat. The amount of recovered waste heat mentioned here refers to an amount of recovered waste heat from the gas engine 33. A line L21 indicates a relationship between loads and amounts of recovered waste heat when the cooling water inlet temperature is T1° C. A left end of the line L21 (a point P21) indicates a relationship between a load and an amount of recovered waste heat at the waste heat utilization maximum load. The case of the waste heat utilization maximum load is a case in which an amount of gas consumption is 0.

Meanwhile, the line L21 indicates the relationship between the load and the amount of recovered waste heat when the amount of gas consumption is set to increase to the right along the line.

A line L22 indicates a relationship between the loads and the amounts of recovered waste heat when the cooling water inlet temperature is T2° C. A left end of the line L22 (a point P22) indicates a relationship between a load and an amount of recovered waste heat at the waste heat utilization maximum load. Meanwhile, the line L22 indicates the relationship between the load and the amount of recovered waste heat when the amount of gas consumption is set to increase to the right along the line.

In addition, a line L23 indicates a relationship between loads and amounts of recovered waste heat when the cooling water inlet temperature is T3° C. A left end of the line L23 (a point P23) indicates a relationship between a load and an amount of recovered waste heat at the waste heat utilization maximum load. Meanwhile, the line L23 indicates the relationship between the load and the amount of recovered waste heat when the amount of gas consumption is set to increase to the right along the line.

The relationship between the load and the amount of recovered waste heat at the waste heat utilization maximum load is indicated by a line L24. The line L24 can be considered as showing an amount of recovered waste heat required for causing an amount of gas consumption to be 0 for each of loads.

A relationship between a waste heat utilization maximum load $Q_{opt2}$ and an amount of recovered waste heat E as indicated by the line L24 is expressed by Formula (2) using a function $f_2$ of the amount of recovered waste heat E.

[Math. 2]

$$Q_{opt2} = f_2(E) \qquad (2)$$

With respect to the example of FIG. 7, the relationship between the waste heat utilization maximum load $Q_{opt2}$ and the amount of recovered waste heat E can be set to an approximate straight line using a linear function of the amount of recovered waste heat E as the function $f_2$.

The amount of recovered waste heat E is obtained from, for example, an output of the gas engine 33. In addition, in a case in which a plurality of waste heat recovery type absorption chillers 32 are connected to one gas engine 33, the waste heat per device that is obtained by dividing the waste heat from the gas engine 33 by a quantity of waste heat recovery type absorption chillers 32 to operate is used as the amount of recovered waste heat E.

In order to set an amount of fuel gas supplied to the waste heat recovery type absorption chillers 32 to zero, it is necessary to set a load of the waste heat recovery type absorption chiller 32 to be smaller than or equal to the smaller load between $Q_{opt1}$ and $Q_{opt2}$. Thus, a waste heat utilization maximum load $Q_{opt1}$ of the waste heat recovery type absorption chiller 32 is expressed by Formula (3).

[Math. 3]

$$Q_{opt}=\mathrm{MIN}(f_1(Ti), f_2(E)) \qquad (3)$$

A function MIN outputs a minimum value among a plurality of argument values. Thus, MIN $(f_1(Ti), f_2(E))$ indicates a smaller value between the value of $f_1(Ti)$ and the value of $f_2(E)$.

The storage unit 380 stores, for example, the function of the function formula (3) in advance, and the waste heat utilization maximum load acquisition unit 391 reads the function of Formula (3) from the storage unit 380, for example. In addition, the waste heat utilization maximum load acquisition unit 391 acquires a measured value of the cooling water inlet temperature from the genelink controlling device 53 via the communication unit 310.

Furthermore, the waste heat utilization maximum load acquisition unit 391 acquires an amount of waste heat of the gas engine 33. The waste heat utilization maximum load acquisition unit 391 acquires, for example, an output of the gas engine from a controlling device of the gas engine 33 via the communication unit 310 and calculates the amount of waste heat based on the obtained output of the gas engine.

Then, the waste heat utilization maximum load acquisition unit 391 substitutes the obtained measured value of the cooling water inlet temperature into the function $f_1$ to calculate the waste heat utilization maximum load $Q_{opt1}$.

As in the case of the information indicating the relationship between the inlet cooling water temperature and the waste heat utilization maximum load, a form of information indicating a relationship between the amount of waste heat to be supplied to the waste heat recovery type absorption chillers 32 and the waste heat utilization maximum load which is stored in the storage unit 380 is not limited to a function form. For example, the storage unit 380 may store the relationship between the amount of waste heat to be supplied to the waste heat recovery type absorption chillers 32 and the waste heat utilization maximum load in a table form.

The optimal load range determination unit 392 determines a predetermined load range from the waste heat utilization maximum load obtained by the waste heat utilization maximum load acquisition unit 391 to be an optimal load range of each of the waste heat recovery type absorption chillers 32.

The optimal load range determined by the optimal load range determination unit 392 will be described referring to FIGS. 8 and 9.

Figure 8:
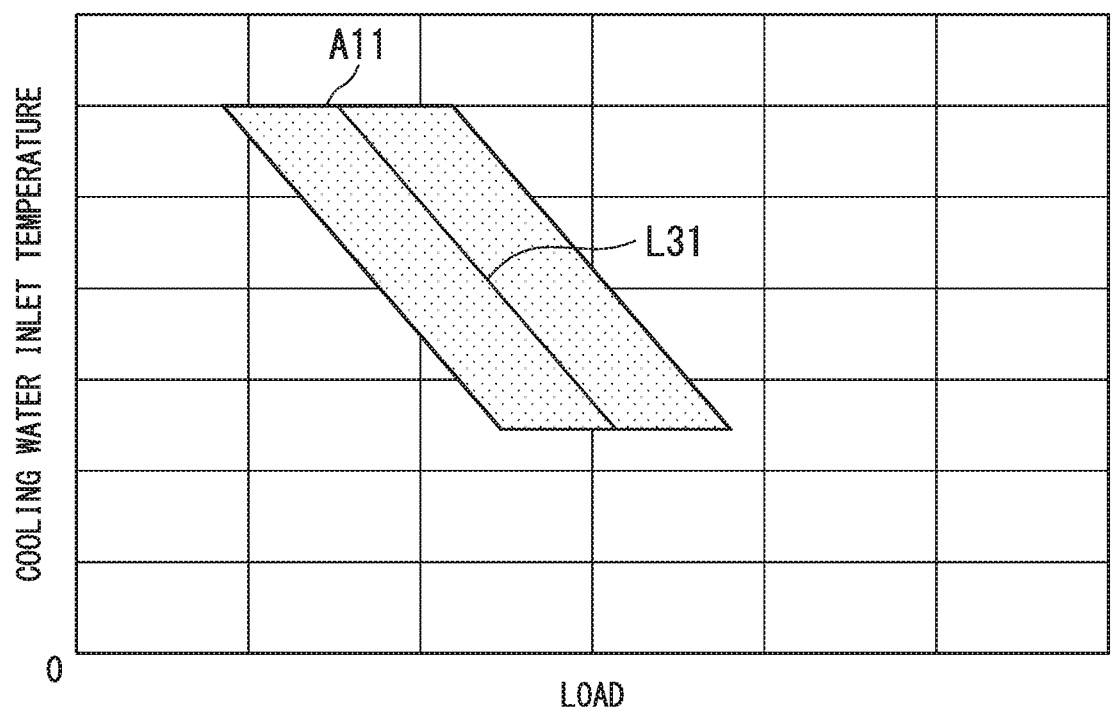
FIG. 8 is a graph showing an example of setting an optimal load range of the waste heat recovery type absorption chiller according to the embodiment of the present invention.

FIG. 8 is a graph showing an example of setting an optimal load range of the waste heat recovery type absorption chiller 32. The horizontal axis of FIG. 8 represents the load and the vertical axis thereof represents the cooling water inlet temperature. The optical load range of the waste heat recovery type absorption chiller 32 corresponds to an example of a first optimal load range.

FIG. 8 shows an example of setting of an optical load range in the case in which the gas engine 33 emits a sufficient amount of waste heat, and the optimal load range determination unit 392 sets an area within a predetermined range from the waste heat utilization maximum load determined through Formula (1) as an optimal load range. Specifically, a line L31 indicates an example of the waste heat utilization maximum load $Q_{opt1}$ determined through Formula (1). The optimal load range determination unit 392 sets an area A11 within ±15% from the waste heat utilization maximum load $Q_{opt1}$ as an optimal load range. Also in a case in which the gas engine 33 emits an insufficient amount of waste heat, an area within a predetermined load range from the waste heat utilization maximum load determined through Formula (3) can be set as an optimal load range.

As described above, the optimal load range determination unit 392 determines a predetermined load range from the waste heat utilization maximum load to be an optimal load range of the waste heat recovery type absorption chiller 32.

In addition, the optimal load range determination unit 392 obtains an optimal load range of each of the centrifugal chillers 22.

Figure 9:
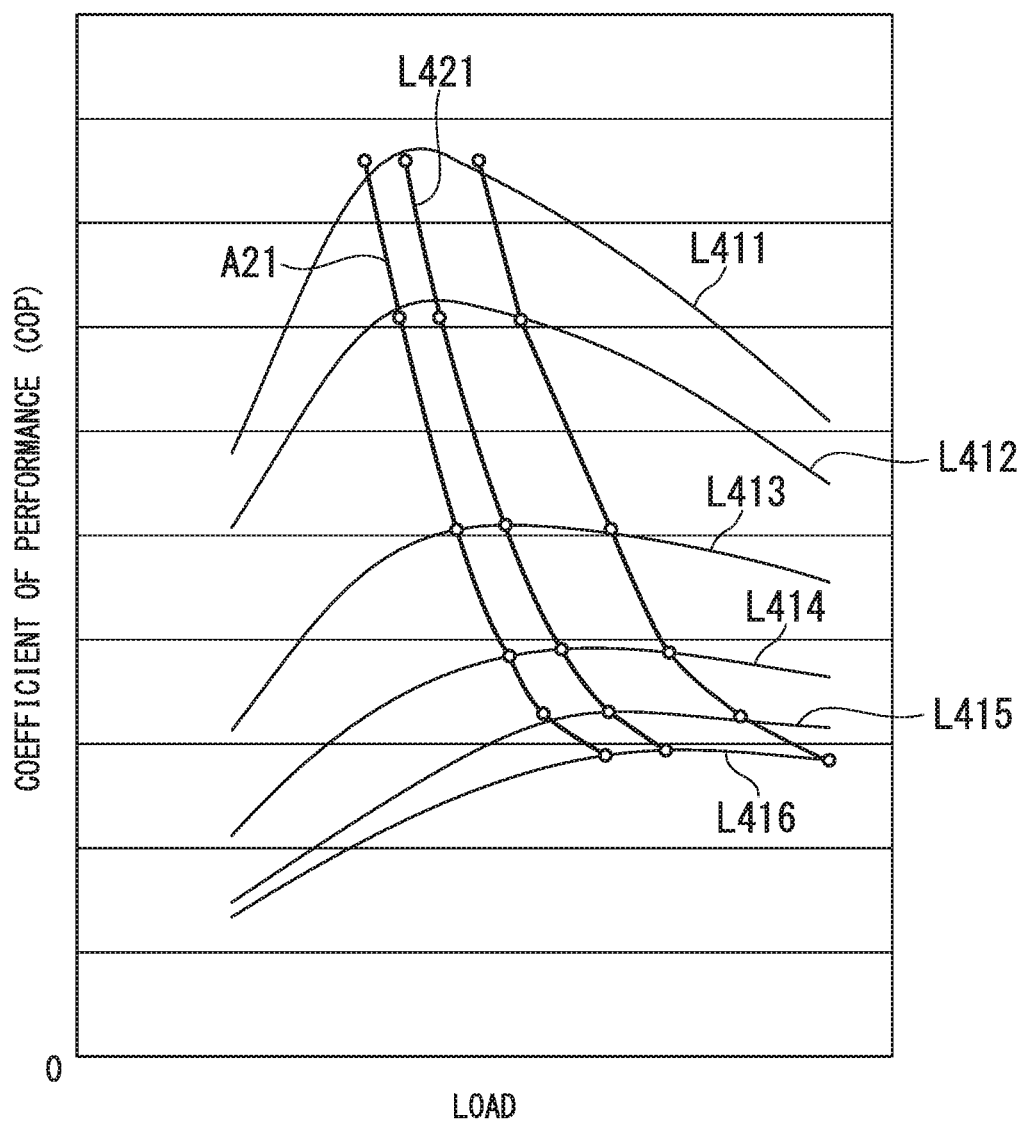
FIG. 9 is a graph showing an example of setting an optimal load range of a centrifugal chiller according to the embodiment of the present invention.

FIG. 9 is a graph showing an example of setting an optimal load range of the centrifugal chiller 22. The horizontal axis of FIG. 9 represents the load of the centrifugal chiller 22 and the vertical axis thereof represents a coefficient of performance of the centrifugal chiller 22. A known method can be used as a method for obtaining a coefficient of performance of the centrifugal chiller. An optimal load range of the centrifugal chiller 22 corresponds to an example of a second optimal load range.

Lines L411 to L416 indicate relationships between loads and coefficients of performance of the centrifugal chiller 22 for each cooling water temperature. A line L421 links points on the lines L411 to L416 at which coefficients of performance have maximum values.

The optimal load range determination unit 392 sets an area within a predetermined range from the loads at which the coefficients of performance have the maximum values as indicated by the line L421 as an optimal load range of the centrifugal chiller 22.

The optimal load range determination unit 392 may set an optimal load range of the centrifugal chiller 22 based on a coefficient of performance, for example, by setting an area within a range from a maximum value of the coefficient of performance to a value of "the maximum value −0.1" as an optimal load range of the centrifugal chiller 22. Alternatively, the optimal load range determination unit 392 may set an optimal load range of the centrifugal chiller 22 based on a load, for example, by setting an area within a range from a load at which the coefficient of performance has a maximum value to a load of ±10 with respect to the aforementioned load as an optimal load range of the centrifugal chiller 22.

The machine quantity control unit 393 controls a quantity of centrifugal chillers 22 and waste heat recovery type absorption chillers 32 to operate based on the optimal load range obtained by the optimal load range determination unit.

Specifically, the machine quantity control unit 393 calculates a quantity of centrifugal chillers 22 and waste heat recovery type absorption chillers 32 to operate within the optimal load range acquired by the optimal load range determination unit 392.

To that end, the machine quantity control unit 393 compares a load required for the heat source system 2 with the sum of a total of minimum values of optimal load ranges set for the waste heat recovery type absorption chillers 32 to operate and a total of minimum values of optimal load ranges set for the centrifugal chillers 22 to operate. A minimum value of a range is a lower limit value of the range.

In a case in which the required load is smaller than the sum of the totals of the minimum values of the optimal load ranges, the machine quantity control unit 393 reduces the quantity of waste heat recovery type absorption chillers 32 or centrifugal chillers 22 to operate by one. Accordingly, the machine quantity control unit 393 sets the load required for the heat source system 2 to be equal to or greater than the sum of the total of the minimum values of the optimal load ranges set for the waste heat recovery type absorption chillers 32 to operate and the total of the minimum values of the optimal load ranges set for the centrifugal chillers 22 to operate.

In addition, the machine quantity control unit 393 compares the load required for the heat source system 2 with the sum of a total of maximum values of the optimal load ranges set for the waste heat recovery type absorption chillers 32 to operate and a total of maximum values of the optimal load ranges set for the centrifugal chillers 22 to operate. A maximum value of a range is an upper limit value of the range.

In a case in which the required load is greater than the sum of the totals of the maximum values of the optimal load ranges, the machine quantity control unit 393 increases the quantity of waste heat recovery type absorption chillers 32 or centrifugal chillers 22 to operate by one. Accordingly, the machine quantity control unit 393 sets the load required for the heat source system 2 to be smaller than or equal to the sum of the total of the maximum values of the optimal load ranges set for the waste heat recovery type absorption chillers 32 to operate and the total of the maximum values of the optimal load ranges set for the centrifugal chillers 22 to operate.

Then, the machine quantity control unit 393 determines a centrifugal chiller 22 or a waste heat recovery type absorption chiller 32 to be activated or stopped based on the calculated quantity of devices to operate. The machine quantity control unit 393 can use any of various methods as a method for determining a heat source device to be activated or stopped. The heat source device to be activated or stopped by the machine quantity control unit 393 may be the centrifugal chiller 22 or the waste heat recovery type absorption chiller 32.

For example, the machine quantity control unit 393 may prioritize activating a heat source device having a short operation time and prioritize stopping a heat source device having a long operation time. Alternatively, each of the heat source devices may be given an order of priority in advance and then the machine quantity control unit 393 may determine heat source devices to be activated or stopped in the order of priority. Furthermore, the machine quantity control unit 393 determines loads to be distributed to the centrifugal chillers 22 and the waste heat recovery type absorption chillers 32 to operate. At this time, the machine quantity control unit allocates the loads so that all of the centrifugal chillers 22 and the waste heat recovery type absorption chillers 32 to operate have loads within the optimal load ranges.

Next, an operation of the system controlling device 51 will be described with reference to FIG. 10.

Figure 10:
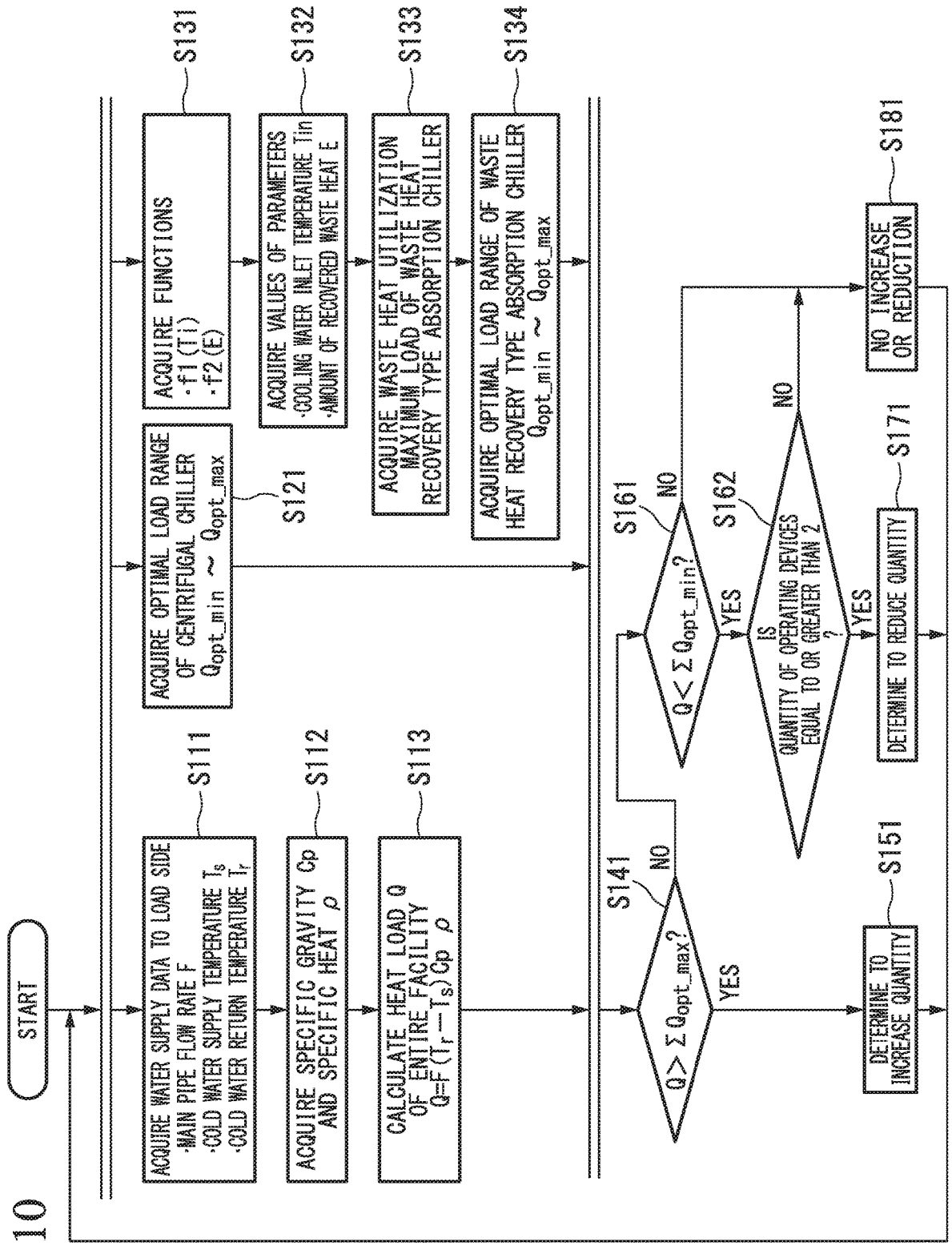
FIG. 10 is a flowchart showing a procedure of the system controlling device according to the embodiment of the present invention to determine the quantity of centrifugal chillers and waste heat recovery type absorption chillers to operate.

FIG. 10 is a flowchart showing a procedure of the system controlling device 51 to determine the quantity of centrifugal chillers 22 and waste heat recovery type absorption chillers 32 to operate.

In the process of FIG. 10, the machine quantity control unit 393 acquires water supply data including a main pipe flow rate F, a cold water supply temperature $T_s$, and a cold water return temperature $T_r$ of cooling water to be sent to the external load 90 (Step S111).

In addition, the machine quantity control unit 393 acquires a proportion Cp and specific heat $\rho$ of the cooling water to be sent to the external load 90 (Step S112). These values are stored in, for example, the storage unit 380 as constants in advance.

Then, the machine quantity control unit 393 calculates a heat load (specifically, an amount of chilled heating medium that the external load 90 consumes) Q of the entire heat source system 2 based on Formula (4) (Step S113).

[Math. 4]

$$Q=F(T_r-T_s)Cp\rho \qquad (4)$$

The heat load Q corresponds to an example of the load required for the heat source system 2. However, a method for the machine quantity control unit 393 to acquire the required load is not limited to the above example. For example, the machine quantity control unit 393 may acquire information indicating the required load from a controlling device of the external load 90 via the communication unit 310.

In addition, the optimal load range determination unit 392 acquires an optimal load range of the centrifugal chiller 22 (Step S121). For example, the optimal load range determination unit 392 acquires the optimal load range based on a relationship between a load and a coefficient of performance of the centrifugal chiller 22 as described above with reference to FIG. 9.

Note that a maximum value of the optimal load range is denoted by $Q_{opt\_max}$ and a minimum value thereof is denoted y $Q_{opt\_min}$. In a case in which there are a plurality of centrifugal chillers 22, the optimal load range is acquired for each of the centrifugal chillers 22.

In addition, the waste heat utilization maximum load acquisition unit 391 reads the functions $f_1(Ti)$ and $f_2(E)$ that the storage unit 380 stores in advance (Step S131). Further, the waste heat utilization maximum load acquisition unit 391 acquires a measured value of the cooling water inlet temperature Ti and a calculated value of the amount of recovered waste heat E (Step S132).

Then, the waste heat utilization maximum load acquisition unit 391 obtains a waste heat utilization maximum load of the waste heat recovery type absorption chiller 32 (Step S133). Specifically, the waste heat utilization maximum load acquisition unit 391 substitutes the measured value obtained in Step S132 into the function obtained in Step S131 and thereby obtains the waste heat utilization maximum load of the waste heat recovery type absorption chiller 32.

Then, the optimal load range determination unit 392 obtains an optimal load of the waste heat recovery type absorption chiller 32 based on the waste heat utilization maximum load acquired by the waste heat utilization maximum load acquisition unit 391 (Step S134). When there are a plurality of waste heat recovery type absorption chillers 32, optimal load ranges of the waste heat recovery type absorption chillers 32 are obtained in Steps S131 to S134.

Next, the machine quantity control unit 393 determines whether the heat load Q of the entire heat source system 2 is greater than a total of maximum values $Q_{opt\_max}$ of the optimal load ranges of the centrifugal chillers 22 and the waste heat recovery type absorption chillers 32 (Step S141).

If the heat load of the entire heat source system 2 is determined to be greater than the total of the maximum values of the optimal load ranges of the centrifugal chillers 22 and the waste heat recovery type absorption chillers 32 (YES in Step S141), the machine quantity control unit 393 determines to increase a quantity of the heat source systems 2 or the centrifugal chillers 22 (Step S151). Specifically, the machine quantity control unit 393 determines to activate any one of stopping centrifugal chillers 22 or waste heat recovery type absorption chillers 32.

After Step S151, the process of FIG. 10 ends.

On the other hand, if the heat load of the entire heat source system 2 is determined to be smaller than or equal to the total of the maximum values of the optimal load ranges of the centrifugal chillers 22 and the waste heat recovery type absorption chillers 32 in Step S141 (NO in Step S141), the machine quantity control unit 393 determines whether the heat load Q of the entire heat source system 2 is smaller than a total of minimum values $Q_{opt\_min}$ of the optimal load ranges of the centrifugal chillers 22 and the waste heat recovery type absorption chillers 32 (Step S161).

The case in which the heat load of the entire heat source system 2 is determined to be smaller than the total of the minimum values of the optimal load ranges of the centrifugal chillers 22 and the waste heat recovery type absorption chillers 32 (YES in Step S161) will be described. In this case, the machine quantity control unit 393 determines whether the quantity of operating heat source devices (the centrifugal chillers 22 and the waste heat recovery type absorption chillers 32) is two or more (Step S162). If the quantity of operating devices is determined to be two or more (YES in Step S162), the machine quantity control unit 393 determines to reduce the quantity of the centrifugal chillers 22 or the waste heat recovery type absorption chillers 32 (Step S171). Specifically, the machine quantity control unit 393 determines to stop any one of the operating centrifugal chillers 22 or waste heat recovery type absorption chillers 32. The machine quantity control unit 393 determines a refrigerator to be stopped in order to cause at least one waste heat recovery type absorption chiller 32 to operate. The reason for this is that, since the waste heat recovery type absorption chiller 32 recovers waste heat and generates chilled heating medium, the heat source system 2 can have higher efficiency.

After Step S171, the process of FIG. 10 ends.

On the other hand, if the heat load of the entire heat source system 2 is determined to be equal to or greater than the total of the minimum values of the optimal load ranges of the centrifugal chillers 22 and the waste heat recovery type absorption chillers 32 in Step S161 (No in Step S161), the process of FIG. 10 ends. In this case, the number of centrifugal chillers 22 or waste heat recovery type absorption chillers 32 is not increased or reduced.

In addition, if the quantity of operating devices is determined to be one or fewer in Step S162 (NO in Step 162), the process of FIG. 10 ends. In this case, the number of centrifugal chillers 22 or waste heat recovery type absorption chillers 32 is not increased or reduced. The reason for this is that, if the quantity of operating heat source devices is 0, no chilled heating medium can be supplied.

As described above, the machine quantity control unit 393 causes at least one waste heat recovery type absorption chiller 32 to operate and controls the quantity of heat source devices to operate when the maximum value of the optimal load range of the waste heat recovery type absorption chiller 32 is smaller than or equal to the load required for the heat source system 2. Meanwhile, if the maximum value of the optimal load ranges of the waste heat recovery type absorption chillers 32 to operate is greater than the load required for the heat source system 2, the machine quantity control unit 393 maintains an operation of one waste heat recovery type absorption chiller 32.

In a case in which an optimal load range of each heat source device is set to be narrow, there is a possibility of the condition in which the sum of the total of the minimum values of the optimal load ranges of the heat source devices to operate is equal to or greater than the required load and the sum of the maximum values of the optimal load ranges of the heat source devices to operate is smaller than or equal to the required load not being satisfied no matter how many devices are set for the quantity of heat source devices to operate. In this case, energy supplying system 1 repeats increase and reduction of the quantity of heat source devices and thus enters a so-called state of hunting. Thus, the optimal load range determination unit 392 sets the waste heat recovery type absorption chiller 32 to be wide to a certain degree and sets the optimal load range for the centrifugal chillers 22 to be wider to a certain degree. Specifically, the above-described width is set to be a width of an optimal load range at which the quantity of devices to operate satisfying that the sum of the minimum values of the optimal load ranges of heat source devices to operate is equal to or greater than the required load and the sum of the maximum values of the optimal load ranges of heat source devices to operate is smaller than or equal to the required load is necessarily present within an assumed range of the required load.

The machine quantity control unit 393 may control only the quantity of centrifugal chillers 22 to operate. For example, when the waste heat recovery type absorption chillers 32 are set to operate at all times and the machine quantity control unit 393 controls only a quantity of centrifugal chillers 22 to operate, operation of the waste heat recovery type absorption chillers 32 may be prioritized.

Alternatively, the machine quantity control unit 393 may control quantities of centrifugal chillers 22 and waste heat recovery type absorption chillers 32 to operate.

As described above, the waste heat utilization maximum load acquisition unit 391 obtains the waste heat utilization maximum load of the waste heat recovery type absorption chiller 32 based on information indicating the relationship between a cooling water temperature and the waste heat utilization maximum load and the cooling water temperature. In addition, the optimal load range determination unit 392 obtains an optimal load range of the waste heat recovery type absorption chiller 32 based on the waste heat utilization maximum load.

In addition, the machine quantity control unit 393 causes at least one waste heat recovery type absorption chiller 32 to operate. Further, the machine quantity control unit 393 controls a quantity of centrifugal chillers 22 to operate based on the optimal load range determined by the optimal load range determination unit 392 when the load required for the heat source system 2 is greater than the maximum value of the optimal load range of the waste heat recovery type absorption chiller 32. Specifically, the machine quantity control unit 393 controls the quantity of centrifugal chillers 22 to operate so that the sum of a total of minimum values of first optimal load ranges of the waste heat recovery type absorption chillers 32 to operate and a total of minimum values of second optimal load ranges of the centrifugal chillers 22 to operate is smaller than or equal to the load required for the heat source system 2 and the sum of a total of maximum values of the first optimal load ranges and a total of maximum values of the second optimal load ranges is equal to or greater than the load required for the heat source system 2. The first optimal load range is an optimal load range of the waste heat recovery type absorption chiller 32 obtained by the optimal load range determination unit 392. The second optimal load range is an optimal load range set for the centrifugal chiller 22 in which the centrifugal chiller 22 generates chilled heating medium.

Here, in addition to the influence of an amount of waste heat, a temperature of cooling water is considered to significantly affect a capability of the waste heat recovery type absorption chiller. Thus, when the machine quantity control unit 393 controls the quantity of centrifugal chillers 22 and waste heat recovery type absorption chillers 32 to operate in accordance with a temperature of cooling water, the heat source system 2 can operate with good efficiency.

In a case in which the heat source system 2 includes one waste heat recovery type absorption chiller 32, as in the configuration illustrated in FIG. 1, for example, the heat source system 2 can operate with good efficiency at a lower cost when the centrifugal chillers 22 generate chilled heating medium than when the waste heat recovery type absorption chiller receives supply of gas fuel to generate chilled heating medium.

The machine quantity control unit 393 may control a quantity of at least one of the waste heat recovery type absorption chillers 32 or the centrifugal chillers 22 to operate other than a waste heat recovery type absorption chiller 32 whose operation is maintained among the waste heat recovery type absorption chillers 32 so that the operation of the at least one waste heat recovery type absorption chiller 32 is maintained and the sum of the total of the minimum values of the first optimal load ranges and the total of the minimum values of the second optimal load ranges is smaller than or equal to the load required for the heat source system 2 and the sum of the total of the maximum values of the first optimal load ranges and the total of the maximum values of the second optimal load ranges is equal to or greater than the load required for the heat source system 2.

Accordingly, in the case in which the heat source system 2 includes a plurality of waste heat recovery type absorption chillers 32, the heat source system 2 can operate with good efficiency.

The waste heat utilization maximum load acquisition unit 391 may further obtain an optimal load based on information indicating a relationship between an amount of waste heat to be supplied to the waste heat recovery type absorption chillers 32 and the optimal load and the amount of waste heat to be supplied to the waste heat recovery type absorption chillers.

Accordingly, the machine quantity control unit 393 can control a quantity of the centrifugal chillers 22 and the waste heat recovery type absorption chillers 32 to operate in accordance with an amount of waste heat an amount of waste heat from the gas engine 33, and even when the amount of waste gas is not sufficient, the heat source system 2 can operate with good efficiency.

Although the example in which the energy supplying system 1 aims to minimize an amount of energy consumption of heat source devices has been described above, the energy supplying system 1 may aim to minimize gas and electric charges. In this case, the optimal load range determination unit 392 determines an optimal load range of each heat source device based on the gas and electricity charges. Alternatively, the energy supplying system 1 may aim to minimize gas and electric charges. In a case in which a gas rate is low, for example, a load of the waste heat recovery type absorption chillers 32 may be increased when the optimal load range determination unit 392 multiplies the load of the waste heat recovery type absorption chillers 32 by 1.1, or the like.

Alternatively, the energy supplying system 1 may aim to minimize an amount of carbon dioxide emissions. In this case, the optimal load range determination unit 392 determines an optimal load range of each heat source device based on the amount of carbon dioxide emissions.

The energy supplying system 1 may give a weight to a load in accordance with a configuration of a heat source device. For example, in a case in which a heat source device is an inverter centrifugal chiller, an earlier increase in the number of machines may be allowed when the optimal load range determination unit 392 multiplies a load of the inverter centrifugal chiller by 0.9.

In a case in which the waste heat recovery type absorption chiller 32 is a waste heat recovery type absorption chiller of a cooling water variable flow rate-employed type, the system controlling device 51 may set a flow rate of cooling water in accordance with an optimal load range of the waste heat recovery type absorption chiller 32. Accordingly, the system controlling device 51 can perform finer control of the heat source system 2.

Note that a process of each constituent unit may be performed by recording a program for realizing all or some of the functions of the system controlling device 51 on a computer readable recording medium, causing the program recorded on the recording medium to be read in a computer system, and executing the program. The "computer system" mentioned here includes an OS or hardware such as peripheral devices.

The "computer readable recording medium" includes a portable medium such as a flexible disk, a magneto-optical disk, a ROM, or a CD-ROM, or a storage device including a hard disk mounted in the computer system. In addition, the program may be one to realize some of the above-described functions, or may be realized in combination with a program for the above-described functions already recorded in the computer system.

So far, the embodiment of the present invention has been described in detail with reference to the drawings; however, specific configurations are not limited to the embodiment, and include modifications of designs within a scope not departing from the gist of the invention.

INDUSTRIAL APPLICABILITY

The embodiment of the present invention relates to a machine quantity controlling device which includes a waste heat utilization maximum load acquisition unit that obtains, in a heat source system including a first heat source device, which is a waste heat recovery type absorption chiller that generates chilled heating medium by receiving supply of at least one of waste heat and a fuel, and a second heat source device, which is a heat source device other than a waste heat recovery type absorption chiller, a waste heat utilization maximum load, which is a maximum load when the first heat source device generates chilled heating medium by receiving only supply of the waste heat, based on information indicating a relationship between a temperature of cooling water of the first heat source device and the waste heat utilization maximum load and a current temperature of the cooling water; an optimal load range determination unit that determines a predetermined load range from the waste heat utilization maximum load to be an optimal load range of the first heat source device; and a machine quantity control unit that causes at least one of the first heat source devices to operate and controls a quantity of second heat source devices to operate so that, when a load required for the heat source system is greater than a maximum value of the optimal load range of the first heat source device, the sum of a total of minimum values of the first optimal load range, which is the optimal load range of the first heat source device to operate among the first heat source devices and a total of minimum values of a second optimal load range set as an optimal load range in which the second heat source device to operate among the second heat source devices generates chilled heating medium is smaller than or equal to the load required for the heat source system and the sum of a total of maximum values of the first optimal load range and a total of maximum values of the second optimal load range is equal to or greater than the load required for the heat source system.

According to the embodiment, the heat source system can operate with good efficiency.

REFERENCE SIGNS LIST

1 Energy supplying system
2 Heat source system
11 Supply header
12 Medium flow rate control valve
13 Return header
21 Centrifugal chiller-side pump
22 Centrifugal chiller
31 Genelink-side pump
32 Waste heat recovery type absorption chiller
33 Gas engine
34 Gas engine-side pump
41 Bypass valve
51 System controlling device
52 Centrifugal chiller controlling device
53 Genelink controlling device
90 External load
310 Communication unit
380 Storage unit
390 Control unit
391 Waste heat utilization maximum load acquisition unit
392 Optimal load range determination unit
393 Machine quantity control unit

The invention claimed is:

1. A machine quantity controller comprising: an acquisition unit that obtains a waste heat utilization maximum load based on information indicating a relationship between a temperature of cooling water of a heat source device and the waste heat utilization maximum load and a current temperature of the cooling water, the waste heat utilization maximum load being a maximum load when the heat source device generates chilled heating medium by receiving only supply of a waste heat, the heat source device in a heat source system including at least one first heat source device and a second heat source device, the first heat source device being a waste heat recovery absorption chiller that generates chilled heating medium by receiving supply of at least one of waste heat and a fuel, the second heat source device being a heat source device other than the waste heat recovery absorption chiller; a determination unit that determines a predetermined load range from the waste heat utilization maximum load to be a first optimal load range that is an optimal load range of the first heat source device; and a machine quantity control unit that causes at least one of the first heat source device to operate and controls a quantity of the second heat source device to operate so that, when a load required for the heat source system is greater than a maximum value of the optimal load range of the first heat source device, a sum of a total of minimum values of the first optimal load range of the first heat source device to operate and a total of minimum values of a second optimal load range of the second heat source device to operate is smaller than or equal to the load required for the heat source system, and a sum of a total of maximum values of the first optimal load range and a total of maximum values of the second optimal load range is equal to or greater than the load required for the heat source system, the second optimal load range being set as an optimal load range in which the second heat source device to operate generates chilled heating medium.

2. The machine quantity controller according to claim 1, wherein the at least one first heat source device is a plurality of first heat source devices, and wherein the machine quantity control unit maintains an operation of at least one of the plurality of first heat source devices, and the machine quantity control unit controls a quantity of at least one of the first heat source devices other than the at least one first heat source device whose operation is maintained among the plurality of first heat source devices and the second heat source device to operate, so that the sum of the total of the minimum values of the first optimal load range and the total of the minimum values of the second optimal load range is smaller than or equal to the load required for the heat source system, and the sum of the total of the maximum values of the first optimal load range and the total of the maximum values of the second optimal load range is equal to or greater than the load required for the heat source system.

3. The machine quantity controller according to claim 1, wherein the acquisition unit further obtains the waste heat utilization maximum load based on information indicating a relationship between an amount of waste heat to be supplied to the first heat source device and the waste heat utilization maximum load and a current amount of waste heat being supplied to the first heat source device.

4. An energy supplying system, comprising: the machine quantity controller described in claim 1; and the heat source system.

5. A computer readable recording medium which controls a heat source system that includes at least one first heat source device and a second heat source device, the first heat source device being a waste heat recovery absorption chiller that generates chilled heating medium by receiving supply of at least one of waste heat and a fuel, the second heat source device being a heat source device other than the waste heat recovery absorption chiller, to perform: obtaining a waste beat utilization maximum load based on information indicating a relationship between a temperature of cooling water of the first heat source device and the waste heat utilization maximum load and a current temperature of the cooling water, the waste heat utilization maximum load being a maximum load when the first heat source device generates chilled heating medium by receiving only supply of the waste heat; determining a predetermined load range from the waste heat utilization maximum load to be a first optimal load range as an optimal load range of the first heat source device; and causing at least one of the first heat source device to operate and controlling a quantity of the second heat source device to operate so that, when a load required for the heat source system is greater than a maximum value of the optimal load range of the first heat source device, a sum of a total of minimum values of the first optimal load range of the first heat source device to operate and a total of minimum values of a second optimal load range of the second heat source device to operate is smaller than or equal to the load required for the heat source system and a sum of a total of maximum values of the first optimal load range and a total of maximum values of the second optimal load range is equal to or greater than the load required for the heat source system, the second optimal load range being set as an optimal load range in which the second heat source device to operate generates chilled heating medium.

* * * * *